United States Patent [19]
Harrell

[11] Patent Number: 5,820,079
[45] Date of Patent: Oct. 13, 1998

[54] MECHANISM FOR MOUNTING AND ACTUATING A MOMENTUM WHEEL WITH HIGH VIBRATION ISOLATION

[75] Inventor: John P. Harrell, Mission Viejo, Calif.

[73] Assignee: Hughes Electronics, Los Angeles, Calif.

[21] Appl. No.: 843,115

[22] Filed: Apr. 24, 1997

Related U.S. Application Data

[63] Continuation of Ser. No. 639,862, Apr. 29, 1996, abandoned, which is a continuation of Ser. No. 223,299, Apr. 5, 1994, abandoned.

[51] Int. Cl.$^6$ .............................. F16F 15/12; B64D 27/00; B64G 1/38
[52] U.S. Cl. .............................. 244/165; 244/54; 248/556
[58] Field of Search .................................. 244/54, 158 R, 244/164, 165, 166; 248/554, 555, 556, 557

[56] References Cited

U.S. PATENT DOCUMENTS

| | | | |
|---|---|---|---|
| 3,264,880 | 8/1966 | Fischel . | |
| 3,817,508 | 6/1974 | Bergstrom et al. . | |
| 3,955,858 | 5/1976 | Poubeau | 244/166 |
| 4,170,904 | 10/1979 | Fischell et al. | 244/166 |
| 4,242,917 | 1/1981 | Bennett et al. . | |
| 4,270,393 | 6/1981 | Osborne et al. . | |
| 4,537,382 | 8/1985 | Beck . | |
| 4,620,752 | 11/1986 | Fremerey et al. | 310/90.5 |
| 4,752,884 | 6/1988 | Slafer et al. | 244/166 |
| 4,901,357 | 2/1990 | Albright . | |
| 5,112,012 | 5/1992 | Yuan et al. | 244/165 |
| 5,244,170 | 9/1993 | Shekher | 244/54 |
| 5,333,819 | 8/1994 | Stetson, Jr. | 244/164 |

FOREIGN PATENT DOCUMENTS

| | | | |
|---|---|---|---|
| 539930 | 10/1992 | European Pat. Off. . | |
| 1380694 | 10/1963 | France . | |
| 2535480 | 10/1982 | France . | |
| 9324763 | 3/1992 | WIPO . | |
| 9414654 | 7/1994 | WIPO | 244/165 |

*Primary Examiner*—Andres Kashnikow
*Assistant Examiner*—Virna Lissi Mojica
*Attorney, Agent, or Firm*—Leonard A. Alkov; William C. Schubert; Glenn H. Lenzen, Jr.

[57] ABSTRACT

An apparatus for mounting a momentum wheel assembly (10) to a spacecraft (54). The momentum wheel assembly (10) includes a momentum wheel which has a primary spin axis coinciding with the primary spin axis of the spacecraft and spins in a direction opposite that of the spacecraft (54). Suspension isolation struts (20) attach the momentum wheel assembly (10) to the spacecraft (54) and provide substantial vibration isolation between the spacecraft (54) and the momentum wheel assembly (10). Voice coil actuators (40) attach to an adaptor ring (14) which in turn attaches to the spacecraft (54). The voice coil actuators (40) magnetically interact with a magnetically conductive element (42) attached to the momentum wheel assembly case (12). Interaction between the voice coil actuators (40) and the magnetic element (42) provides forces which displace the momentum wheel assembly case (12) in two axes orthogonal to the primary spin axis.

16 Claims, 2 Drawing Sheets

MECHANISM FOR MOUNTING AND ACTUATING A MOMENTUM WHEEL WITH HIGH VIBRATION ISOLATION

This is a continuation of application Ser. No. 08/639,862, filed Apr. 29, 1996 now abandoned, which in turn is a continuation application Ser. No. 08/223,299, filed Apr. 5, 1994 now abandoned.

This invention was made with Government support under a contract awarded by an agency of the United States Government. The Government has certain rights in this invention.

BACKGROUND OF THE INVENTION

1. Technical Field

This invention broadly relates to an apparatus and method of mounting a momentum wheel assembly of a spacecraft having a displaceable momentum wheel assembly providing spacecraft attitude control and providing high mechanical vibration isolation.

2. Discussion

In a spin-stabilized spacecraft, a momentum wheel has an axis of rotation substantially coinciding with the stabilized spin axis of the spacecraft. The momentum wheel spins in a direction opposite the stabilized spin direction of the spacecraft at substantially the same angular momentum. Such a configuration yields a net momentum of zero imparted to the spacecraft by stabilized spin.

In one particular momentum wheel configuration, a momentum wheel is rigidly bolted to the spacecraft so that its spin axis substantially parallels the spin axis of the spacecraft, and the momentum wheel spins in a direction opposite that of the spin direction of the spacecraft at substantially the same angular momentum. In order to slew the spin axis or to point and steer the spacecraft from one direction to another, control thrusters are used to create the starting and stopping forces. When control thrusters are used to point and steer the spacecraft, additional propellant is required which increases the spacecraft weight, requires additional power to control the spacecraft, and results in the spacecraft experiencing additional vibration. In a second type of momentum wheel configuration, a momentum wheel has a nominal spin axis which substantially parallels the spin axis of the spacecraft and spins at an angular momentum to substantially cancel out the angular momentum of the spacecraft. The momentum wheel is mounted on gimbals, rather than rigidly, which enable pivoting about the two axes orthogonal to the primary spin axis of the spacecraft. By pivoting the momentum wheel about the orthogonal axes, the spacecraft may be pointed and steered in accordance with the size and weight of the spacecraft and the degree of pivot about the axes.

In order to control the attitude of a spacecraft having a momentum wheel, torques applied between the spacecraft and the case housing the momentum wheel displace the momentum wheel spin axis from the spacecraft stabilized spin axis, resulting in controlled pointing and steering of the spacecraft. Conventional methods employed to position the momentum wheel assembly generally involve the above described mechanical gimbals which rotate the momentum wheel about two orthogonal axes using bearings or flexures. Positioning occurs when motors or screw actuator linkages provide torques to the momentum wheel assembly. However, these mechanisms provide little mechanical isolation between the spinning momentum wheel assembly and the spacecraft.

While the above-mentioned systems do provide momentum cancellation in the spacecraft, spinning momentum wheels inherently produce vibrational forces over a broad frequency band, degrading the stability of the spacecraft as a pointing platform and/or disturbing sensitive instruments. Accordingly, it is desirable to reduce such vibrational forces in order to provide a more stable platform for pointing as well as to protect such sensitive instruments. It is further desirable to provide a momentum wheel assembly which is significantly isolated from the spacecraft in order to reduce vibrations translated from the momentum wheel assembly to the spacecraft.

SUMMARY OF THE INVENTION

In accordance with the teachings of the present invention, this invention is directed to an apparatus for mounting a momentum wheel assembly to a spacecraft having a primary spin axis. The momentum wheel assembly is adapted to be mounted to the spacecraft and is pivotable about first and second axes other than the primary spin axis. The apparatus includes a means for pivoting the momentum wheel assembly about the first or the second pivot axes and further includes suspension isolation for mounting the momentum wheel assembly to the spacecraft. The suspension isolation means provides substantial vibration isolation between the spacecraft and the momentum wheel assembly.

Additional objects, features and advantages of the present invention will become apparent from the following description and the appended claims, taken in connection with the accompanying drawings.

BRIEF DESCRIPTION OF THE DRAWINGS

The various advantages of the present invention will become apparent to one skilled in the art by reading the following specification and by reference to the following drawings in which.

DETAILED DESCRIPTION OF THE PREFERRED EMBODIMENTS

The following description of the preferred embodiments is merely exemplary in nature and not intended to limit the invention or its application or uses.

Figure 1:
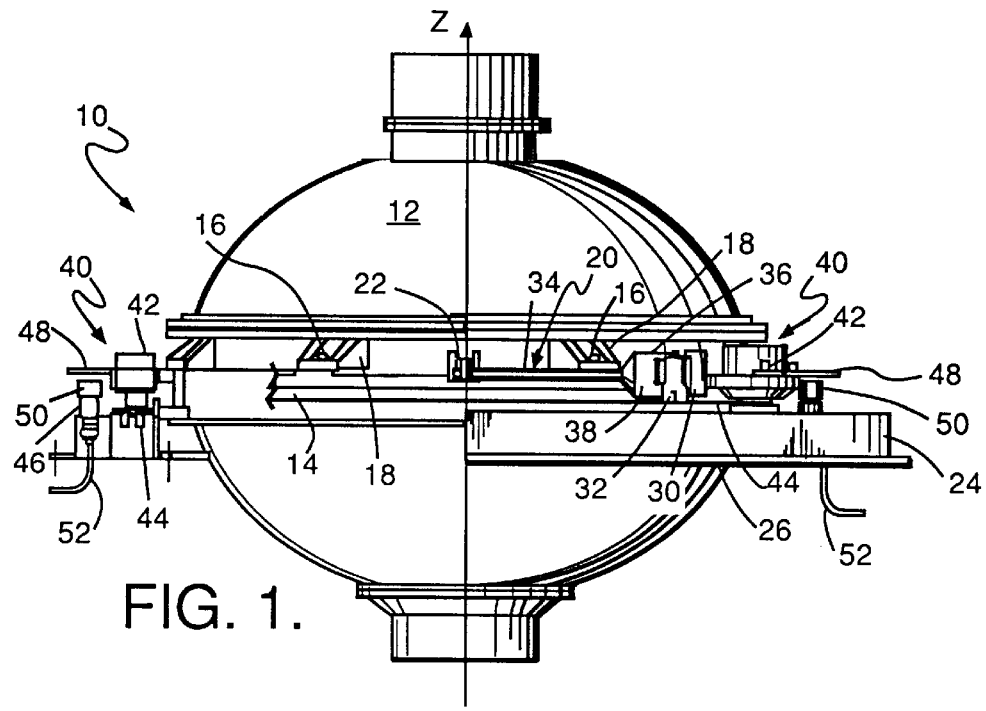
FIG. 1 is a partial cross-sectional view of a spacecraft with an attached momentum wheel assembly in accordance with the principles of the present invention.
Figure 2:
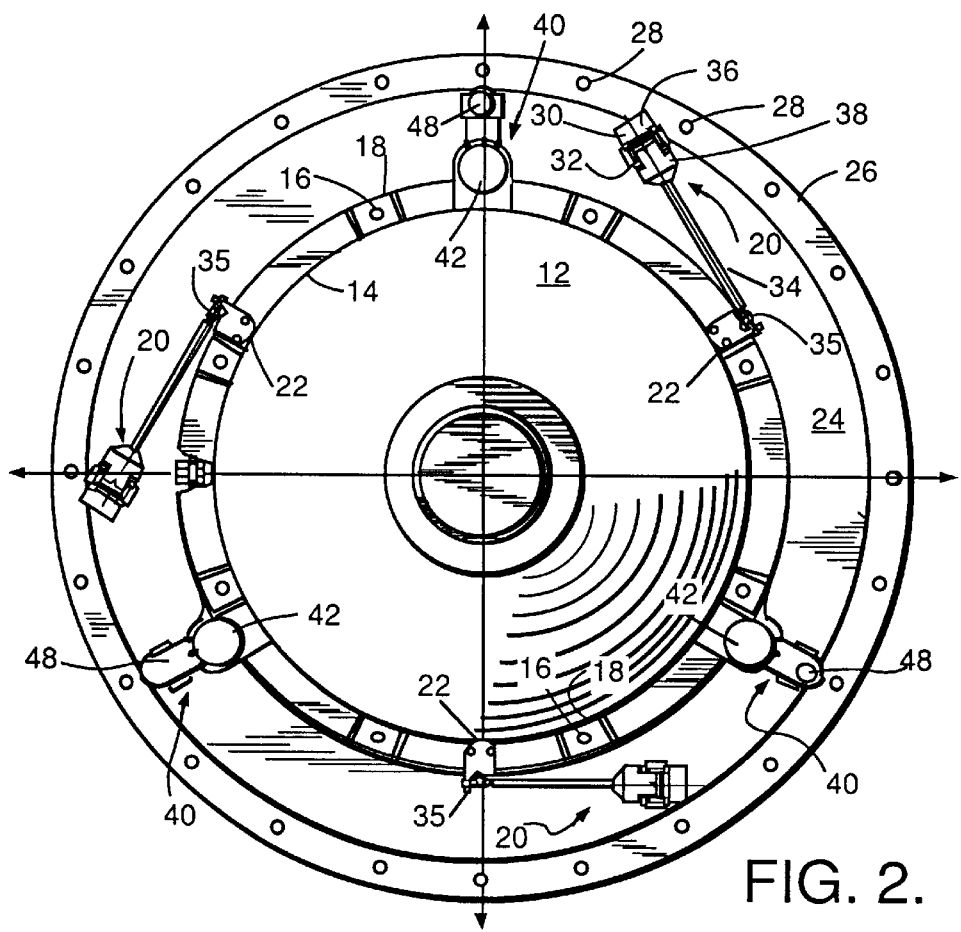
FIG. 2 is a cross-sectional top view of the momentum wheel assembly.

Referring to FIGS. 1 and 2, a momentum wheel assembly 10 is arranged in accordance with the principles of the present invention. A momentum wheel assembly case 12 connects to an adaptor ring 14 via through bolts 16 which pass through case mounts 18, a plurality of which are present on adaptor ring 14. Adaptor ring 14 provides convenient mounting for interconnection between the momentum wheel assembly case 12 and the momentum wheel assembly suspension to be described herein. Adaptor ring 14 and attached momentum wheel assembly case 12 are supported at three points via three isolator strut assemblies 20 which connect to adaptor ring 14 at adaptor ring feet 22 via any of a number of appropriate fastener configurations, but preferably are through bolted to adaptor ring 14. At their other end, isolator strut assemblies 20 connect by any of a number of suitable fastening means to spacecraft mounting ring 24. In the embodiment depicted in FIGS. 1 and 2, isolator strut mounting flanges 32 attach to isolator body 30 so as to enable translational movement and provide damping.

Isolator strut assembly 20 functions similarly to automobile shock absorbers and includes a strut 34 projecting outwardly from cylinder assembly 36 which includes cylinder 38, isolator body 30, and appropriate mounting components such as isolator strut mounting flanges 32. Strut 34 attaches to adaptor ring 14 via threaded engagement with flexure 35. Flexure 35 enables limited radial translation of strut 34 which engage, but inhibit axial motion of the engagement. Cylinder 38 contains a viscous fluid in an enclosed chamber (not shown) and an orifice through which the fluid must pass as strut 34 is compressed or extended. Thus, the isolator strut assembly 20 provides damping of vibrations near the frequency of the natural modes of oscillation of the momentum wheel case suspension. Isolation strut assembly 20 mounts to adaptor ring 14 and spacecraft mounting ring 24 with compliance to rotational motion so that momentum wheel assembly case 12 is free to tilt about the X and Y axes. Thus, isolator strut assemblies 20 provide vibration isolation in those degrees of freedom and provide rotational freedom about the X and Y axes so that torques may be applied between adaptor ring 14 and spacecraft mounting ring 24 to effect spacecraft attitude control, to be explained further herein. Furthermore, the suspension strut assemblies are relatively compliant along the axial direction of the strut 34 to constrain the momentum wheel compliantly in translation in the X–Y plane and in rotation about the Z plane. This characteristic provides vibration isolation in those degrees of freedom.

Momentum wheel assembly case 12 pivots about the X and Y axes in order to displace the momentum wheel rotating within momentum wheel assembly case 12 from the X–Y plane to effect steering and pointing of the spacecraft. Voice coil actuator assemblies 40 generate torques which pivot the momentum wheel assembly case 12 about the X and Y axes. Each voice coil actuator assembly 40 includes a magnet 42 connected to adaptor ring 14 which magnetically communicates with a voice coil 44. Voice coil 44 produces a magnetic field upon the application of an electrical current through wires (not shown) applied in accordance with command signals generated by a controller (not shown). Voice coil 44 mounts to spacecraft mounting ring 24 and is mechanically isolated from momentum wheel assembly case 12. Thus, only magnetic contact exists between voice coil 44 and magnet 42. Also shown in FIG. 1 are position sensors 46 which provide information regarding the displacement of a particular conductive plate 42 from its corresponding sensing coil 44. Each of the position sensors 46 embodied in FIG. 1 is an inductive sensor and electrically communicates with conductive plate 48. Position sensor 46 detects a magnetic field which varies in accordance with the displacement between sensor head 50 and conductive plate 48. A position sensor 46 and associated conductive plate 48 are generally provided with each voice coil assembly 40 so that the tilt of the momentum wheel assembly case 12 (and the associated momentum wheel) about each of the X and Y axes may be determined in accordance with a signal output by each of the position sensors 46. A wire 52 provides electrical input and output signals to one of position sensors 46.

Figure 3:
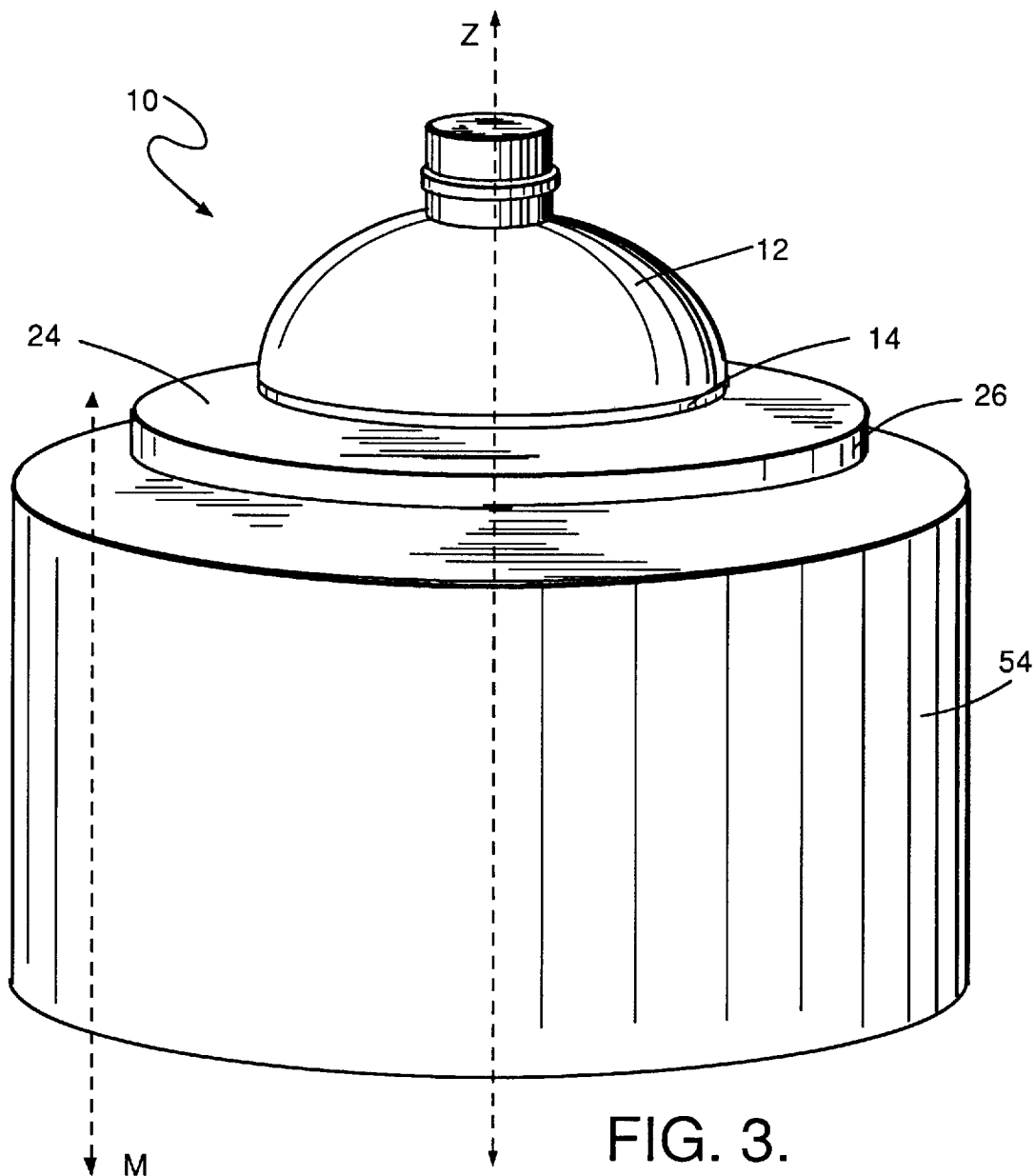
FIG. 3 is a perspective view of the momentum wheel isolation assembly mounted to a portion of the spacecraft.

Referring to FIG. 3, in operation, the momentum wheel assembly 10 attaches to spacecraft 54 via spacecraft mounting ring 24 and mounting ring flange 26. The mounting ring 24 is received by the spacecraft via through bolts passing through mounting ring flange 26. The mounting location of the momentum wheel assembly 10 is chosen in accordance with a number of factors, including the balancing of masses about the spin axis of the spacecraft, location of sensitive instrumentation, solar positioning, and space considerations. When mounted, the Z axis of the momentum wheel assembly 10 preferably parallels the spin axis M of spacecraft 54, and the momentum wheel (not shown) lies substantially in the X–Y plane. The momentum wheel assembly case 12 is nominally not pivoted about the X or the Y axes when the spacecraft is in static equilibrium. Because the voice coil actuator assemblies 40 provide translational motion without mechanical contact between the moving and stationary members, no vibrational forces are transmitted from the momentum wheel assembly case 12 via voice coil actuator assemblies 40.

Thus, the only possible path for transmission of vibration to the spacecraft is through isolator strut assemblies 20 which are compliant and damped to effectively limit the forces and moments translated therethrough. By selecting strut compliances accordingly, the suspension may be tuned to as low a natural frequency as possible, thereby achieving maximum isolation within the range of acceptable motion between the momentum wheel and the spacecraft under dynamic conditions. Moreover, because the mechanism is in a weightless environment during operation, a minimum amount of stiffness is required in the suspension to maintain proper nominal orientation. For example, the suspension could be typically tuned to achieve fundamental frequencies between 0.2 and 6 Hz.

It is to be understood that the invention is not limited to the exact construction illustrated and described above, but that various changes and modifications may be made without departing from the spirit and scope of the invention as defined in the following claims.

What is claimed is:

1. A spacecraft having a primary spin axis, comprising:
   a spacecraft body;
   a momentum wheel assembly adapted to be mounted to the spacecraft body and being pivotable about first and second axes, the first and second axes being other than parallel to the primary spin axis;
   means for pivoting the momentum wheel assembly about the first or second pivot axes; and
   suspension isolation means for coupling the momentum wheel assembly to the spacecraft body and providing substantial vibration isolation in three degrees of freedom between the spacecraft and the momentum wheel assembly wherein the suspension isolation means is substantially oriented in a plane perpendicular to the primary spin axis of the spacecraft.

2. The apparatus as defined in claim 1 wherein the pivoting means further comprises:
   a voice coil actuator operatively connected to the spacecraft; and
   a magnetically conductive member operatively connected to the momentum wheel assembly, the magnetically conductive member magnetically communicating with the voice coil actuator such that upon energization of the voice coil actuator, a resulting magnetic field provides a magnetic force to displace the momentum wheel assembly.

3. The apparatus as defined in claim 2 wherein the voice coil actuator further comprises a plurality of coil actuators, and the magnetically conductive member comprises a plurality of conductive members.

4. The apparatus as defined in claim 2 further comprising a momentum wheel adaptor ring mounted to the momentum wheel assembly.

5. The apparatus as defined in claim 4 wherein the momentum wheel adaptor ring further comprises:

mounting feet receptive to the suspension isolation means; and mounting means receptive to the magnetically conductive members.

6. The apparatus as defined in claim 5 further comprising a mounting flange connected to the spacecraft receptive to the voice coil actuator and mounting means receptive to a second end of the suspension isolation means.

7. In a spacecraft having a primary spin axis, an apparatus for providing vibration isolation between a momentum wheel assembly and the spacecraft, comprising:

a momentum wheel assembly adapted to be mounted to the spacecraft and being pivotable about first and second axes, the first and second axes being other than the primary spin axis;

a mounting flange connected to the spacecraft;

a voice coil actuator operatively connected to the mounting flange;

a momentum wheel adaptor ring mounted to the momentum wheel assembly;

a magnetically conductive member operatively connected to the momentum wheel adaptor ring for pivoting the momentum wheel assembly about the first or second pivot axes, the magnetically conductive member magnetically communicating with said voice coil actuator such that upon energization of the voice coil actuator, a resulting magnetic field provides a magnetic force to displace the momentum wheel assembly; and a suspension isolation strut having a first end connected to the mounting flange and a second end connected to the adaptor ring for mounting the momentum wheel assembly to the spacecraft and providing substantial vibration isolation between the spacecraft and the momentum wheel assembly.

8. The apparatus as defined in claim 7 wherein the suspension strut is substantially aligned in a plane perpendicular to the primary spin axis of the spacecraft.

9. The apparatus as defined in claim 8 wherein the voice coil actuator further comprises a plurality of voice coil actuators, and the magnetically conductive member further comprises a plurality of magnetically conductive members.

10. The apparatus as defined in claim 9 wherein the momentum wheel adaptor ring further comprises:

mounting feet receptive to the suspension isolation struts; and mounting means receptive to the magnetically conductive members.

11. In a spacecraft having a primary spin axis, a method for isolating vibration, said method comprising:

providing a spacecraft body;

providing a momentum wheel assembly adapted to be mounted to the spacecraft body and including a momentum wheel being pivotable about first and second axes, the first and second axes being other than the primary spin axis;

providing means for pivoting the momentum wheel assembly about the first and second pivot axes;

mounting the momentum wheel assembly to the spacecraft body using vibration isolation means between the spacecraft body and the momentum wheel assembly; and mounting an isolation strut assembly providing vibration isolation in three degrees of freedom between the momentum wheel assembly and the spacecraft body; and substantially aligning the isolation strut in a plane perpendicular to the primary spin axis of the spacecraft.

12. The method as defined in claim 11 wherein the step of providing a means for pivoting the momentum wheel assembly further comprises:

attaching a voice coil actuator to the spacecraft; and attaching a magnetically conductive member to the momentum wheel assembly, the magnetically conductive member magnetically communicating with the voice coil actuator such that upon energization of the voice coil actuator, a resulting magnetic field provides a magnetic force to displace the momentum wheel assembly.

13. The method as defined in claim 12 wherein the step of attaching the voice coil actuator further comprises:

attaching a plurality of voice coil actuators to the spacecraft; and attaching a plurality magnetically conductive members to the momentum wheel assembly.

14. The method as defined in claim 13 further comprising the steps of:

mounting the suspension isolation means to feet on the adaptor ring; and mounting the magnetically conductive members to the adaptor ring.

15. The method as defined in claim 12 further comprising the step of mounting a momentum wheel adaptor ring to the momentum wheel assembly.

16. The method as defined in claim 12 further comprising the step of mounting the voice coil actuator and the other end of the suspension isolation strut to a mounting flange connected to the spacecraft.

* * * * *